US010853461B2

(12) United States Patent
Jain et al.

(10) Patent No.: US 10,853,461 B2
(45) Date of Patent: *Dec. 1, 2020

(54) TURING TEST DECODER

(71) Applicant: Yodlee, Inc., Redwood City, CA (US)

(72) Inventors: Vipul Jain, Bangalore (IN); Ritu Bhandari, Bhilwara (IN); Apoorv Awasthi, Ghaziabad (IN)

(73) Assignee: Yodlee, Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/383,245

(22) Filed: Apr. 12, 2019

(65) Prior Publication Data
US 2019/0236247 A1  Aug. 1, 2019

Related U.S. Application Data

(63) Continuation of application No. 15/333,596, filed on Oct. 25, 2016, now Pat. No. 10,303,862.

(51) Int. Cl.
*G10K 11/16* (2006.01)
*G06F 21/31* (2013.01)
(Continued)

(52) U.S. Cl.
CPC .............. *G06F 21/31* (2013.01); *G06F 16/22* (2019.01); *H04L 63/08* (2013.01); *H04L 63/083* (2013.01);
(Continued)

(58) Field of Classification Search
CPC .............. G06F 21/31; G06F 17/30312; G06F 2221/2103; G06F 2221/2133; H04L 63/08
See application file for complete search history.

(56) References Cited

U.S. PATENT DOCUMENTS

2007/0250920 A1  10/2007  Lindsay
2009/0150983 A1* 6/2009  Saxena .................. G06F 21/36
726/7
(Continued)

OTHER PUBLICATIONS

CAPTCHA. Wikipedia, the free encyclopedia. Last updated Aug. 5, 2016. Retrieved on Aug. 8, 2016. Retrieved from the Internet: URL<https://en.wikipedia.org/w/index.php?title=CAPTCHA&oldid=733047686>. 7 pages.

(Continued)

*Primary Examiner* — Mohammed Waliullah
(74) *Attorney, Agent, or Firm* — Fish & Richardson P.C.

(57) ABSTRACT

Methods, systems, and apparatus, including computer programs encoded on computer storage media, for decoding Turing tests. One of the methods includes managing a database that stores data of each of a plurality of aggregation accounts; sending, for a particular account identified by one of the aggregation accounts and to a server, a request for access to account data for the particular account; receiving, from the server, data that includes a login credentials field and a Turing test challenge; extracting the Turing test challenge; providing, to an external system that is a different system from the server, the Turing test challenge; receiving, from the external system, a response to the Turing test challenge; providing, to the server, the response to the Turing test challenge; providing, to the server, the login credentials for the particular account; and receiving, from the server, account data for the particular account.

26 Claims, 3 Drawing Sheets

(51) Int. Cl.
*G06F 16/22* (2019.01)
*H04L 29/06* (2006.01)

(52) U.S. Cl.
CPC .............. *G06F 2221/2103* (2013.01); *G06F 2221/2133* (2013.01)

(56) References Cited

U.S. PATENT DOCUMENTS

| | | |
|---|---|---|
| 2013/0191506 A1 | 7/2013 | Polis et al. |
| 2013/0198821 A1 | 8/2013 | Hitchcock et al. |
| 2013/0198846 A1 | 8/2013 | Chapman |
| 2015/0347731 A1 | 12/2015 | Paxton |
| 2015/0358328 A1* | 12/2015 | Kaplan .............. H04L 67/1095 726/6 |
| 2016/0188866 A1 | 6/2016 | Xie et al. |

OTHER PUBLICATIONS

Huang Shu-guang et al. "A CAPTCHA Recognition Algorithm Based on Holistic Verification," Instrumentation, Measurement, Computer, Communication and Control, 2011 First International Conference, Oct. 2011, ISBN 978-0-7695-4519-6, pp. 525-528.
International Search Report and Written Opinion in International Application No. PCT/US2017/057840, dated Feb. 19, 2018.

* cited by examiner

TURING TEST DECODER

CROSS-REFERENCE TO RELATED APPLICATIONS

This application is a continuation of and claims priority to U.S. application Ser. No. 15/333,596, filed on Oct. 25, 2016.

TECHNICAL FIELD

This specification relates to managing user credentials.

BACKGROUND

A user may have multiple accounts storing private data. For instance, the user may have an online banking account, a social networking account, an email account, a medical account, and an online store account.

When accessing an account, a user may have to respond to a Turing test, e.g., a CAPTCHA (Completely Automated Public Turing test to tell Computers and Humans Apart) test. For instance, a server of the account may require the user to enter a user name, password, and a CAPTCHA response of a CAPTCHA challenge, e.g., a phrase including wavy characters.

SUMMARY

In general, one innovative aspect of the subject matter described in this specification can be embodied in methods that include the actions of managing a database that stores data of each of a plurality of aggregation accounts, each aggregation account identifying one or more user accounts and the data of a particular user account indicating a) a reference to a server from which the system requests account data of the particular user account and b) login credentials for accessing the account data; sending, for the particular user account from the user accounts identified by the plurality of aggregation accounts and to the server referenced by the data of the particular user account in the database, a request for access to the account data for the particular user account; receiving, from the server, data that includes a login credentials field for entry of the login credentials to access the account data and that includes a Turing test challenge and a Turing test challenge response field; extracting the Turing test challenge from the data in response to receiving the data from the server; providing, to an external system that is a different system from the server, the Turing test challenge; receiving, from the external system, a response to the Turing test challenge; providing, to the server, the response to the Turing test challenge as input for the Turing test challenge response field; providing, to the server, the login credentials for the particular user account as input for the login credentials field in response to receiving the data that includes the login credentials field from the server; and receiving, from the server, account data for the particular user account in response to providing the response to the Turing test challenge and providing the login credentials for the particular user account. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include receiving, from a user device separate from the external system and prior to receiving the data, the login credentials for the particular user account; and storing, in a record for the particular user account in the database, the login credentials. The method may include managing a second database that includes reliability data for two or more external systems including the external system, the reliability data indicating a likelihood that respective responses from each external system will be successful for accessing account data. The method may include selecting, using the reliability data in the database, the external system for analysis of the Turing test challenge using the reliability data. The method may include managing a second database that includes reliability data for two or more external systems including the external system. The method may include storing, in the database, reliability data that identifies the external system and identifies whether accessing account data for the particular user account using the response to the Turing test challenge received from the external system is successful. The method may include selecting, using second reliability data from the second database, the external system from the two or more external systems for processing the Turing test challenge. Providing, to the external system that is a different system from the server, the Turing test challenge may be responsive to selecting, using the second reliability data from the second database, the external system for processing the Turing test challenge.

In some implementations, the method may include selecting, using date or time information, the external system for processing the Turing test challenge. Providing, to the external system that is a different system from the server, the Turing test challenge is responsive to selecting, using date or time information, the external system for processing the Turing test challenge. The method may include selecting, using data of the particular user account, the external system for processing the Turing test challenge. Providing, to the external system that is a different system from the server, the Turing test challenge is responsive to selecting, using the data for the particular user account, the external system for processing the Turing test challenge. Providing, to the external system that is a different system from the server, the Turing test challenge may include providing, to another external system that is a different system from the server and the external system, the Turing test challenge; determining that a predetermined threshold amount of time has passed without receiving a response to the Turing test challenge from the other external system; and providing, to the external system, the Turing test challenge in response to determining that the predetermined threshold amount of time has passed without receiving a response to the Turing test challenge from the other external system.

In some implementations, the method may include providing, to one or more second external systems that are each a different system from the server and the external system, the Turing test challenge; receiving, from each of one or more of the second external systems, a second response to the Turing test challenge; comparing the response to the Turing test challenge and each of the one or more second responses to determine which responses are the same; and selecting the response to the Turing test challenge using a result of comparing the response to the Turing test challenge and each of the one or more second responses to determine which responses are the same. Providing, to the server, the response to the Turing test challenge as input for the Turing test challenge response field may be responsive to selecting the response to the Turing test challenge. Selecting the response to the Turing test challenge using the result of comparing the response to the Turing test challenge and each of the one or more second responses to determine which responses are the same may include determining that the response to the Turing test challenge was received from a particular external system from a group consisting of the external system and the second external systems that has a higher reliability score than the other external systems in the group. Selecting the response to the Turing test challenge using the result of comparing the response to the Turing test challenge and each of the one or more second responses to determine which responses are the same may include determining that the response to the Turing test challenge was received from multiple external systems from a group consisting of the external system and the second external systems that together have a higher reliability score than the other external systems in the group. Selecting the response to the Turing test challenge using the result of comparing the response to the Turing test challenge and each of the one or more second responses to determine which responses are the same may include determining that the response to the Turing test challenge was received from more external systems from a group consisting of the external system and the second external systems than any of the other second responses received from the other external systems in the group.

In some implementations, the method may include providing, to one or more second external systems that are each a different system from the server and the external system, the Turing test challenge; determining that a predetermined threshold amount of time has passed without receiving a response to the Turing test challenge from any of the second external systems; and selecting the response to the Turing test challenge in response to determining that the predetermined threshold amount of time has passed without receiving a response to the Turing test challenge from any of the second external systems. Providing, to the server, the response to the Turing test challenge as input for the Turing test challenge response field may be responsive to selecting the response to the Turing test challenge. The method may include receiving, from the database, the reference associated with the particular user account and the login credentials for the particular user account. Sending the request for access to account data for the particular user account may be responsive to receiving the reference associated with the particular user account. The method may include receiving, from the database, the reference associated with the particular user account; and receiving, from the database and after receiving the data that includes the login credentials field for entry of login credentials to access the account data, the login credentials for the particular user account. Sending the request for access to account data for the particular user account may be responsive to receiving the reference associated with the particular user account.

In some implementations, providing, to the external system that is a different system from the server, the Turing test challenge may include sending the Turing test challenge to the external system. The method may include managing a second database that includes Turing test challenge data. The method may include storing, in the second database, the Turing test challenge. Providing, to the external system that is a different system from the server, the Turing test challenge may include sending a link that identifies the Turing test challenge to the external system. The method may include managing a second database that includes Turing test challenge data. The method may include storing, in the second database, the Turing test challenge. Providing, to the external system that is a different system from the server, the Turing test challenge may include setting permissions for the Turing test challenge in the second database to allow the external system access to the Turing test challenge in the second database.

In some implementations, the method may include managing a second database that identifies a position for the Turing test challenge in the data. Extracting the Turing test challenge from the data may include parsing, using the position for the Turing test challenge in the data, the data to determine the particular data; and selecting the particular data from the data. The second database may identify a second position for the Turing test challenge response field in the data and a third position for the login credentials field in the data. Providing the response to the Turing test challenge as input for the Turing test challenge response field may include identifying a second identifier for the Turing test challenge response field that is included in the data using the second position for the Turing test challenge response field in the data; and providing the response to the Turing test challenge as input for the identified Turing test challenge response field using the second identifier. Providing login credentials for the particular user account as input for the login credentials field may include identifying a third identifier for the login credentials field that is included in the data using the third position for the login credentials field in the data; and providing the login credentials as input for the identified login credentials field using the third identifier.

In some implementations, receiving, from the server, data that includes the login credentials field for entry of login credentials to access the account data and that includes the Turing test challenge and the Turing test challenge response field may include receiving, from the server, the data that includes a CAPTCHA challenge and a CAPTCHA challenged response field. Receiving, from the server, data that includes the login credentials field for entry of login credentials to access the account data and that includes the Turing test challenge and the Turing test challenge response field may include receiving, from the server, first data that includes the login credentials field for entry of login credentials to access the account data; and receiving, from the server, second data that includes the Turing test challenge and the Turing test challenge response field. The database may include data for an aggregation account from the plurality of aggregation accounts that identifies the particular user account and a second user account. The method may include causing, for the aggregation account, presentation of account summary data that represents the account data for the particular user account and second account data for the second user account.

The subject matter described in this specification can be implemented in particular embodiments and may result in one or more of the following advantages. In some implementations, the systems and methods described below may access, aggregate, or both, account data received from a server that requires a response to a Turing test challenge without requiring input or intervention from a respective user for the account during the account data retrieval process. For instance, a system does not require a Turing test challenge response from the respective user. Accordingly, a service authorized by the user, e.g., an account information aggregation system, can access the user's account to perform various tasks automatically. The service may improve an account aggregation user experience. In some implementations, the systems and methods described below may use reliability data to select an external system to provide data for a Turing test challenge, to select a challenge response, or both, to improve a likelihood of low latency for communications between an information aggregation system and a server hosting account data. In some implementations, the systems and methods described below may provide a better service than other aggregation systems that require user input, user intervention, or both, from a respective user for the account during the account data retrieval process. A system may automatically, without input or intervention from a user for an account, retrieve data for the account according to a schedule when the system needs to provide a Turing test response to access the data for the account.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
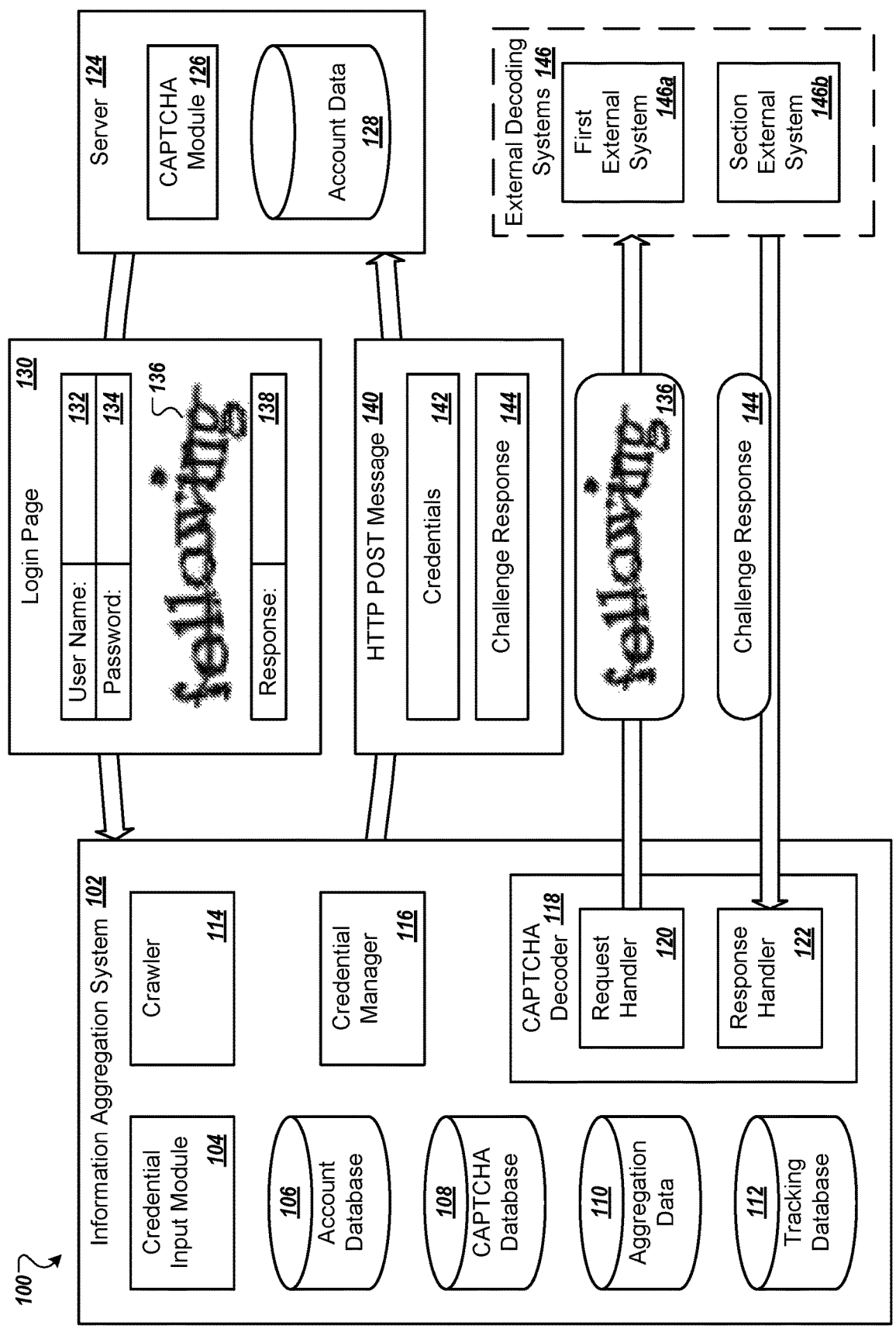
FIG. 1 is an example of an environment in which an information aggregation system retrieves account data from a server.

Some user account systems request a response to a Turing test challenge before allowing access to corresponding account data. For instance, in response to a request for grades, a school system may require a response to a CAPTCHA challenge in addition to a username and password before providing grade data to a user device. Typically a user will personally access each account individually and provide the response to the CAPTCHA to obtain the information for that account.

However, in some situations a user may prefer to rely on an aggregator that can collect data from multiple accounts of the user that are maintained by multiple different entities. For example, a user may have attended multiple schools, and have a separate account at each school which would be used to access the grade data for that school. However, a user could rely on an aggregator to collect the grade data from each school.

An aggregator can operate an information aggregation system that retrieves protected data from multiple accounts of a particular user. Typically the information aggregation system permits the user to access that data from the various accounts through a single interface.

As noted above, the information aggregation system may need to retrieve data from a user account system that requires a Turing test in addition to user credentials as part of an authentication process. To access the account data, the information aggregation system may use an external service to decode a Turing test challenge and receive account data from an account system.

For instance, when the information aggregation system tries to fetch the latest account data from a server for the account system, e.g., by accessing a webpage hosted on the server that provides user access to the account data, the information aggregation system receives a CAPTCHA image from the server. The information aggregation system connects to an external system, separate from the server, and provides the CAPTCHA image to the external system. The information aggregation system may poll the external system until the information aggregation system receives a CAPTCHA result for the CAPTCHA image from the external system. The information aggregation system sends the CAPTCHA result, in addition to user credentials for the account, to the server. In response, the information aggregation system receives the latest account data from the server.

The information aggregation system may store reliability data for multiple external systems in a database. The reliability data includes metrics of the external systems, e.g., for some or all of the external systems. The metrics can include, for example, accuracy rate, latency, hours of operation, or various combinations of the above. The information aggregation system may use the reliability data to determine to which external system from multiple external systems to send a CAPTCHA image. For instance, the information aggregation system may use the reliability data to determine reliability scores for each of the multiple external systems and selected an external system with a highest reliability score. The information aggregation system may send a request to the selected external system for decoding of the CAPTCHA image.

FIG. 1 is an example of an environment 100 in which an information aggregation system 102 retrieves account data from a server 124. The account data can include protected data that is accessible only after authentication. The authentication is based on user credentials and a Turing test. The information aggregation system 102 retrieves the account data from the server 124 as part of an information aggregation process that includes retrieval of account data from multiple different servers for different user accounts associated with a particular user. The information aggregation system 102 may provide data aggregated from the different user accounts to a user device operated by the particular user, e.g., for presentation as an aggregation account summary.

For instance, a credential input module 104 included in the information aggregation system 102 may receive input data from a user device (not shown) that identifies multiple accounts for which the information aggregation system 102 shall retrieve account data. The input data may specify account identifiers, e.g., account names or account numbers for the user accounts. The input data may indicate a service name, e.g., the name of an entity that manages the account. The input data may indicate a respective server reference to each server hosting user account data, such as a uniform resource identifier (URI) that identifies the server and a resource on the server, e.g., a web page, that provides access to the account data. The input data includes login credentials for each of the user accounts. For example, the input data may include a user name and password for each of the user accounts.

The credential input module 104 may receive the input data from the user device using protocols defined by an application programming interface (API). For instance, the credential input module 104 may receive the input data from an application executing on the user device that uses the API. In some implementations, the credential input module 104 includes a web server and receives the input data from the user device in response to presentation of a web page on the user device.

The credential input module 104 stores the input data received from the user device in one or more databases. For instance, the credential input module 104 may store the respective account identifier of each of the user accounts, the respective service name, the respective server reference for each of the user account servers, the login credentials, or a combination of two or more of these, in an account database 106.

The credential input module 104 may create or update one or more records in the account database 106 using the input data received from the user device. When the credential input module 104 determines that the input data indicates creation of a new aggregation account, the credential input module 104 stores data to the account database 106 for the new aggregation account. For example, the credential input module 104 may create a record in the account database 106 that identifies the aggregation account.

As described here, an aggregation account is an account, for a user, on the information aggregation system 102 and includes data for one or more user accounts. An example of a user account is an account on the server 124 for a user. An aggregation account can be associated with multiple user accounts the information for which the information aggregation system 102 retrieves from different servers, including the server 124, and aggregates.

The credential input module 104 may create a respective record for each of the user accounts for which the information aggregation system 102 will retrieve account data. Each of the records may include the respective login credentials, the respective server reference, e.g., URI for the corresponding server, or both. The credential input module 104 may link each of the account records with the record for the new aggregation account.

The information aggregation system 102 includes a crawler 114 that uses the server reference to determine a server 124 that allows access to account data for a particular user account. For instance, the crawler 114 requests the account data for each user account identified by an aggregation account as part of a process to create a summary for the aggregation account that includes account data for each of the user accounts.

When the server reference is a URI, the crawler 114 requests a login form, e.g., a login web page, from the server 124 using the URI. When the server reference is a service name, such as the name of an entity from which the information aggregation system 102 retrieves data, e.g., and the entity that manages the particular user account, the crawler 114 may determine a URI for the service name, as described in more detail below. The crawler 114 may determine a URI for the user account in various ways, request account data from the server 124 in various ways, or both.

In response to sending the request for a login form to the server 124, the crawler 114 receives the login form. For instance, the login form may represent a login page 130 that includes a user name field 132, a password field 134, a CAPTCHA image 136, and a CAPTCHA response field 138. The login page 130 may be a page, e.g., a web page, that, when presented on a display in a web browser or another application, requests login credentials to allow access to account data for the particular user account. In some implementations, the login form may include data for multiple pages, as described in more detail below.

The server 124 may generate the login form, e.g., the login page 130, using a CAPTCHA module 126. For instance, the CAPTCHA module 126 may generate Turing test challenges such as the CAPTCHA image 136. When the server 124 receives the request for login form from the crawler 114, the server 124 requests a CAPTCHA image from the CAPTCHA module 126. In response, the server 124 receives a CAPTCHA image 136 from the CAPTCHA module 126.

The server 124 may include other databases, modules, or both, for generation of the login form. For instance, the server 124 may include a web server, e.g., on the same computer as the CAPTCHA module 126 or another computer, that generates instructions, e.g., HyperText Markup Language (HTML) instructions, for the login page 130.

The crawler 114, or another component of the information aggregation system 102, extracts login field information from the login form. For instance, the crawler 114 may determine a particular location in the login form that includes data for the user name field 132 and the password field 134. In some implementations, the crawler 114 may determine tags or other field identifiers included in the login form that identify data for the user name field 132, data for the password field 134, or both. The crawler 114 may use an API to determine the for the user name field 132, data for the password field 134, or both.

The crawler 114 receives user credentials from a credential manager 116. The crawler 114 may provide an identifier for the particular user account to the credential manager 116. In response, the crawler 114 receives the user credentials from the credential manager 116. The user credentials may include a user name, a password, or both, for the particular user account.

The credential manager 116 retrieves the user credentials from the account database 106. The credential manager 116 may use an identifier for the particular user account as a key to identify a record in the account database 106 that includes the user credentials for the particular user account. The identifier for the particular user account can be, for example, a nickname of the particular user account or a combination of a server reference to the server 124 and a service name or account number of the particular user account.

In some implementations, the crawler 114 receives the user credentials from the credential manager 116 prior to receipt of the login form from the server 124. For instance, the crawler 114 may receive the user credentials with the server reference to the server 124, both for the particular user account. In response, the crawler 114 uses the server reference to the server 124 to request account data for the particular user account from the server 124.

The crawler 114, or another component of the information aggregation system 102, extracts Turing test challenge data from the login form. The Turing test challenge data may be the CAPTCHA image 136, the CAPTCHA response field 138, or both.

The crawler 114 may determine a particular location in the login form that includes data for the Turing test challenge during the extraction process. The crawler 114 may determine tags or other field identifiers included in the login form that identify data for the Turing test challenge. The crawler 114 may use an API to determine the data for the Turing test challenge.

The crawler 114 may store at least some of the Turing test challenge data in a database. For example, the crawler 114 may store the CAPTCHA image 136 in a CAPTCHA database 108. The information aggregation system 102 may allow an external decoding system 146 access to the stored Turing test challenge data, use the stored Turing test challenge data for reliability analysis, or both.

The information aggregation system 102 selects a decoding system from multiple external decoding systems 146 to which the information aggregation system 102 will provide access to the Turing test challenge data. For instance, the information aggregation system 102 uses data stored in a tracking database 112 to select one of the multiple external decoding systems 146. The information aggregation system 102 may select the one of the multiple external decoding systems 146 in various ways, some examples of which are described in more detail below.

In some implementations, the data stored in the tracking database 112 may include reliability data for some or all of the external decoding systems 146. The information aggregation system 102 may use the reliability data to select the one of the multiple external decoding systems 146.

A CAPTCHA decoder 118, included in the information aggregation system 102, provides the Turing test challenge data to the selected external decoding system 146. A request handler 120 included in the CAPTCHA decoder 118 may send a request to a first external system 146*a* that identifies the CAPTCHA image and requests a response for the image. The request may identify the CAPTCHA image by including data for the image, a reference to the image stored in the CAPTCHA database 108, or both.

The request handler 120 may provide the Turing test challenge data to the first external system 146*a* in various ways. For instance, the request handler 120 may use a method defined by an API, for the information aggregation system 102 or the first external system 146*a*, to provide the Turing test challenge data to the first external system 146*a*. In some implementations, the request handler 120 may generate a list of Turing test challenge data stored in the CAPTCHA database 108. The list may include an entry for each CAPTCHA image and an identifier for each entry. The information aggregation system 102 may receive challenge responses that include an identifier from the list and use the identifier to determine a corresponding CAPTCHA image. The information aggregation system 102 may use a mapping of CAPTCHA images to server references to determine a server from which the information aggregation system 102 received the corresponding CAPTCHA image and to which the information aggregation system 102 will provide the challenge response.

The request handler 120 may receive a request from the first external system 146*a* for the list of Turing test challenge data. In response to the request for the list, the request handler 120 provides the list of Turing test challenge data to the first external system 146*a*.

For example, the first external system 146*a* may include an application that periodically polls the information aggregation system 102 for Turing test challenge data assigned to the first external system 146*a*. Upon receipt of the list from the information aggregation system 102, the first external system 146*a* retrieves Turing test challenge data from the CAPTCHA database 108. The first external system 146*a* uses the retrieved Turing test challenge data to determine responses for each of the Turing test challenges identified on the list. The first external system 146*a* provides data for the responses to the information aggregation system 102.

In some implementations, some of the external decoding systems 146 may generate a challenge response for a Turing test challenge using artificial intelligence. For example, the first external system 146*a* may include a neural network that analyzes Turing test challenges and generates a corresponding challenge response for each challenge. The first external system 146*a* provides data for the challenge response to the information aggregation system. One or more of the external decoding systems 146 may use optical character recognition, image recognition processes, image processing methods, or a combination of two or more of these to generate a challenge response for a Turing test challenge.

In some implementations, the CAPTCHA decoder 118 may generate instructions for presentation of a web page that includes a list of Turing test challenge fields and a list of Turing test challenge response fields. For instance, the web page may include, for each Turing test challenge assigned to the first external system 146*a*, a CAPTCHA image and, adjacent to the CAPTCHA image, a field for entry of a corresponding CAPTCHA response. The CAPTCHA decoder 118 may provide the instructions to the first external system 146*a* to cause the first external system 146*a*, e.g., a computer included in the first external system 146*a*, to present the web page on a display. The first external system 146*a* may receive user input that indicates the challenge responses for the Turing test challenges included in the web page in response to presentation of the web page on the display. The first external system 146*a* provides data representing the user input to the information aggregation system 102.

A response handler 122, included in the CAPTCHA decoder 118, receives a challenge response for the Turing test challenge data from the first external system 146*a*. The response handler 122 may receive data for a challenge response 144 using a method that corresponds to the method with which the request handler 120 provided the Turing test challenge data to the first external system 146*a*.

In some implementations, when the request handler 120 provides the first external system 146*a* with data for the CAPTCHA image 136 in a message, the response handler 122 may receive a reply message from the first external system 146*a* that includes data for the challenge response. In some implementations, when the request handler 120 provides the first external system 146*a* with a reference to the image stored in the CAPTCHA database 108 or provides the first external system 146*a* with a list of Turing test challenge data, the response handler 122 may retrieve the data for the challenge response 144 from memory in which the first external system 146*a* stored the challenge response data 144. The memory may include the CAPTCHA database 108 or another database. The information aggregation system 102 may determine that the challenge response data 144 is in memory upon receipt of a message from the first external system 146*a* that indicates that challenge response data is ready for use by the information aggregation system 102.

In some implementations, the response handler 122, or the CAPTCHA decoder 118, may store the challenge response in the CAPTCHA database 108. For instance, the response handler 122 may associate the challenge response with the CAPTCHA image stored in the CAPTCHA database 108.

The information aggregation system 102, e.g., the crawler 114, provides the user credentials for the particular user account and the challenge response to the server 124, e.g., as a response to the login form. The information aggregation system 102 may provide the user credentials for the particular user account and the challenge response to the server 124 in various ways. For instance, the information aggregation system 102 may create a hypertext transfer protocol (HTTP) message 140 that includes data for the user credentials 142 and data for the challenge response 144. In some implementations, the information aggregation system 102 may include the user credential data 142 and the challenge response data 144 in an HTTP POST message 140 or another type of HTTP message.

The information aggregation system 102 may use the fields from the login page 130 to indicate the user credential data 142, the challenge response data 144, or both. For instance, the crawler 114 may use a first identifier for the user name field 132 to indicate that a first data item in the message 140 corresponds to the user name field 132. The crawler 114 may use a second identifier for the password field 134 to indicate that a second data item in the message corresponds to the password field 134. The crawler 114 may use a third identifier for the CAPTCHA response field 138 to indicate that a third data item in the message corresponds to the CAPTCHA response field 138. The third data item can include the challenge response data 144.

The data items included in the message 140 represent the same data retrieved from the account database 106 and the external decoding system 146. The user credential data 142 may be formatted in the same format as the credentials retrieved from the account database 106 or a different format. The challenge response data 144 includes the response received from the external decoding system 146 in the same format as received from the external decoding system or a different format. For example, the crawler 114 may receive the challenge response data generated by the external decoding system 146 and format the challenge response data specific to the types of response data received by the server 124, e.g., as indicated by the login form. The crawler 114 provides the formatted challenge response data 144 to the server 124, e.g., in the message 140.

The crawler 114 may generate a form that includes the user credential data 142, the challenge response data 144, or both. The form may include the identifier for user name field 132, the identifier for the password field 134, the identifier for the CAPTCHA response field 138, or a combination of two or more of these.

In some implementations, the information aggregation system 102 may encrypt the user credentials, the challenge response, or both, and include encrypted data in the message 140. For instance, the information aggregation system 102 may generate encrypted user credential data 142 or encrypted challenge response data 144 in various ways.

The crawler 114 may send multiple messages to the server 124 that each include some of the user credential data 142, the challenge response data 144, or both. For example, the crawler 114 may send a first message to the server 124 that includes data for the user credentials 142 and a second message to the server 124 that includes data for the challenge response 144.

In some implementations, the crawler 114 may send each of the multiple messages to the server 124 in response to receipt of different login form from the server. For instance, crawler 114 may receive any number of messages from that server 124 that each include data for the login form.

The crawler 114 may receive a first message, e.g., a first web page, from the server 124 that includes the user name field 132 and the password field 134. In response to receipt of the first message, the information aggregation system 102 determines the user credentials for the particular user account. The crawler 114 uses the user credentials to generate a first response that includes data for the user credentials, e.g., data for a user name and data for a password. The information aggregation system 102 may encrypt some or all of the data in the first response. The crawler 114 provides the first response to the server 124.

The crawler 114 may receive a second message, e.g., a second web page, from the server 124 that includes the CAPTCHA image 136 and the CAPTCHA response field 138. The crawler 114 may receive the second message from the server 124 in response to providing the first response to the server 124.

The information aggregation system 102 determines a challenge response for the received CAPTCHA image 136, e.g., using the CAPTCHA decoder 118. The information aggregation system 102 generates a second response using data for the challenge response 144. The information aggregation system may encrypt the data for the challenge response that is included in the second response. The crawler 114 provides the challenge response to the server 124.

The crawler 114 receives account data from the server 124. The account data may be data for any type of account. For instance, the account may be an online banking account; a social networking account; an email account; a medical account, e.g., that allows access to medical data from a doctor, a hospital, or both; or an online store account. The crawler 114 may receive the account data in response to providing the user credential data 142 and the challenge response data 144 to the server 124. For instance, when the server 124 receives the challenge response 144 and the user credential data 142, the server 124 determines whether the challenge response 144 and the user credential data 142 are valid, e.g., whether the challenge response 144 is correct for the CAPTCHA image 136 and authenticates the user credential data 142 for the particular user account.

In response to determining that the challenge response 144 and the user credential data 142 are valid, the server 124 accesses account data 128, e.g., a database. The server 124 retrieves data for the particular user account from the account data 128. The server 124 may use the user credential data 142 to determine the data in the account data 128 for the particular user account. The server provides the account data to the crawler 114.

The account data may be specific to the particular user account, such as a user's grades or bank account information. In some implementations, the account data may be accessible by multiple users. For instance, the account data may include subscription news articles or social media that require entry of the user credentials and the challenge response.

The information aggregation system 102 may combine data from multiple different user accounts for an aggregated report that represents data for an aggregation account. For instance, the information aggregation system 102 may determine a summary of the multiple different user accounts on the server 124 or on multiple servers. The user accounts are for a single user.

The information aggregation system 102 may generate data for presentation of the summary. The information aggregation system 102 may provide the data for presentation of the summary to a user device, e.g., operated by the particular user, may include the data in a message, e.g., a body of an email message, or may include the data in any other format. Receipt of the data by the user device may cause the user device to present the summary, e.g., on a display, audibly using a speaker, or both.

The information aggregation system 102 may store reliability data for the external decoding systems 146, e.g., the first external system 146a, in a tracking database 112. For instance, the CAPTCHA decoder 118 may determine a latency of the response time for the first external system 146a, e.g., a time taken by the first external system 146a to generate the challenge response 144 after the first external system 146*a* receives the CAPTCHA image 136. The CAPTCHA decoder 118 may store the latency in the tracking database 112.

The CAPTCHA decoder 118 may determine an accuracy score for the challenge response 144 and store data that represents the accuracy score in the tracking database 112. The crawler 114 may determine whether the server 124 provides access to the account data using the challenge response 144. When the crawler 114 receives access to the account data, the information aggregation system 102 stores data, e.g., an accuracy score, in the tracking database 112 that indicates that the information aggregation system 102 received account data using the challenge response 144, which, in turn, indicates that the challenge response 144 is correct. When the crawler 114 does not receive access to the account data, the information aggregation system 102 stores data, e.g., an accuracy score, in the tracking database 112 that indicates that the challenge response 144 did not provide access to the account data, which, in turn, indicates that the challenge response 144 is incorrect.

A component of the information aggregation system 102, such as the CAPTCHA decoder 118, may use data from the tracking database 112 to select an external decoding system 146 for processing a Turing test challenge. The CAPTCHA decoder 118 may aggregate the accuracy scores for a particular external decoding system 146 to determine an overall accuracy score for the particular external decoding system 146. For instance, the CAPTCHA decoder 118 may determine an overall accuracy score that indicates a ratio of correct responses to incorrect responses. The CAPTCHA decoder 118 may use some or all of the accuracy scores to determine the overall score. The CAPTCHA decoder 118 may select a first external decoding system with a high ratio of correct responses to incorrect responses more than a second external decoding system with a lower ratio of correct responses to incorrect responses for processing of a Turing test challenge.

As the CAPTCHA decoder 118, and the information aggregation system 102, receive additional responses from a particular external decoding system 146, the CAPTCHA decoder 118 may adjust a number of Turing test challenges sent to the particular external decoding system 146 using a change to the overall accuracy score. For example, as a ratio of correct responses to incorrect responses increases, e.g., the overall accuracy score increases, for an external decoding system, the CAPTCHA decoder 118 may send more Turing test challenges to the external decoding system. As a ratio of correct response to incorrect responses decreases, e.g., the overall accuracy score decreases, for an external decoding system, the CAPTCHA decoder 118 may send fewer Turing test challenges to the external decoding system.

The information aggregation system 102 may use a status of a network when generating reliability data for the first external system 146*a*, the challenge response 144, or both. For instance, when the information aggregation system 102 does not receive account data for the particular user account and the information aggregation system 102 determines that there is no longer a connection with the server 124, the information aggregation system 102 determines that a network error prevented the information aggregation system 102 from receiving the account data. In some implementations, the information aggregation system 102 may store reliability data that indicates that a network error prevented access to account data, e.g., by flagging a record in the tracking database 112 that identifies challenge response 144 with data that indicates a network error occurred. The information aggregation system 102 may store the latency data that represents a response time for the first external system 146*a* to generate a challenge response or another type of reliability data in the tracking database 112 when a network error prevented the information aggregation system 102 from receiving the account data.

The information aggregation system 102 may use information about the user credentials when storing reliability data in the tracking database 112. For instance, when the information aggregation system 102 uses multiple challenge responses for different Turing test challenges, e.g., multiple CAPTCHA images 136, the information aggregation system 102 may determine that the user credentials are incorrect or have changed and are preventing access to the account data. In some implementations, the information aggregation system 102 may store reliability data that indicates that the user credentials prevented access to account data, e.g., by flagging a record in the tracking database 112 that identifies challenge response 144 with data that indicates a user credential error occurred. The information aggregation system 102 may store the latency data or another type of reliability data in the tracking database 112 when determining that the user credentials prevented the information aggregation system 102 from accessing the account data.

In some implementations, the information aggregation system 102 may validate user credentials upon receipt of the user credentials from a user device. For instance, when the credential input module 104 receives the user credentials from a user device during a session with the user device, the information aggregation system 102 may use the user credentials to access account data for the particular user account to validate the user credentials during the session with the user device. When the information aggregation system 102 receives account data for the particular user account, the information aggregation system 102 determines that the user credentials are valid and the information aggregation system 102 may end the session. When the information aggregation system 102 does not receive account data for the particular user account, the information aggregation system 102 prompts the user device for updated user credentials during the session.

In some implementations, the information aggregation system 102 may receive a service name as a reference from a user device without receiving a server reference, e.g., a URI that identifies a server that allows access to account data, from the user device. For instance, the service name may specify a particular school, such as "The University." The information aggregation system 102 may include a database that matches service names to server references. When the information aggregation system 102, e.g., the crawler 114, determines to retrieve data for the user account, the information aggregation system 102 access the database using the service name to determine the server reference. The information aggregation system 102 uses the server reference to request account data from the corresponding server, e.g., the server 124.

The information aggregation system 102 may periodically update the service name to server reference mapping in the database. For instance, the information aggregation system 102 may periodically check each existing server reference identified in the database to determine whether the server reference can still be used to retrieve account data for the respective user account or the server reference cannot be used for the user account. When the information aggregation system 102 determines that the server reference cannot be used for the user account, the information aggregation system 102 may use the crawler 114, e.g., that accesses web pages associated with the respective account, to determine an updated server reference for the respective service name. In response to determining the updated server reference, the information aggregation system 102 updates the mapping for the respective service name in the database with the updated server reference.

In some implementations, the information aggregation system 102 may send particular Turing test challenge data to multiple external systems. For instance, the CAPTCHA decoder 118 may send the CAPTCHA image 136 to both the first external system 146a and a second external system 146b.

The CAPTCHA decoder 118 may provide the CAPTCHA image 136 to the first external system 146a at a first time $T_0$. The CAPTCHA decoder 118 may determine that the first external system 146a has not provided a challenge response to the information aggregation system 102 within a predetermined threshold amount of time, e.g., and that a timeout has expired. The CAPTCHA decoder 118 may provide, at a second time $T_1$, the CAPTCHA image 136 to the second external system 146b. In response, the CAPTCHA decoder 118, e.g., the response handler 122, may receive the challenge response 144 from the second external system 146b at a third time $T_2$.

In some implementations, when the CAPTCHA decoder 118 receives the challenge response 144 from the first external system 146a between the second time $T_1$ and the third time $T_2$, the CAPTCHA decoder 118 may use the challenge response 144 from the first external system 146a.

When the CAPTCHA decoder 118 receives multiple challenge responses from different external decoding systems 146, the CAPTCHA decoder 118 may select one of the multiple challenge responses for use in the message 140 using various operations. For instance, the CAPTCHA decoder 118 may use a first received challenge response, a challenge response that was received from a greatest number of the external decoding systems 146, a challenge response selected using reliability data for the external decoding systems 146, e.g., from an external decoding system with a highest overall accuracy score, or a combination of two or more of these.

In some implementations, the CAPTCHA decoder 118 may determine a total number of different challenge responses received from the external decoding systems 146 and select a challenge response for submission to the server 124 based on a voting algorithm. For each of the different challenge responses, the CAPTCHA decoder 118 determines a number of external systems from which the CAPTCHA decoder 118 received the corresponding challenge response. The CAPTCHA decoder 118 selects a particular challenge response that was received from more external decoding systems than any of the other challenge responses.

The CAPTCHA decoder 118 may send the CAPTCHA image 136 to multiple different external decoding systems 146 in response to receipt of the CAPTCHA image 136. For instance, the CAPTCHA decoder 118 may receive the CAPTCHA image 136, select multiple external systems from the external decoding systems 146, and provide the CAPTCHA image 136 to each of the multiple selected external systems, e.g., without waiting for a response from any of the multiple selected external systems. The CAPTCHA decoder 118 may analyze the challenge responses received from each of the multiple selected external systems to determine a particular challenge response with a highest likelihood of being the correct challenge response for the CAPTCHA image 136. The CAPTCHA decoder 118 may select the only challenge response when all responses are the same. The CAPTCHA decoder 118 may select a particular challenge response from multiple different received challenge responses by assigning a reliability score to each of the challenge responses using data from the tracking database 112.

The information aggregation system 102 may use reliability data from the tracking database 112 to select a challenge response. For instance, the CAPTCHA decoder 118 may determine the external decoding systems 146 from which the CAPTCHA decoder 118 received challenge responses. The information aggregation system 102 determines, for each of the determined external decoding systems 146, reliability scores using the reliability data in the tracking database 112. For instance, when challenge responses received from the first external system 146a are more frequently correct than challenge responses received from the second external system 146b, the information aggregation system 102 assigns the first external system 146a a higher reliability score than the second external system 146b. The information aggregation system 102 selects an external system from the determined external decoding systems 146 that has a highest reliability score, e.g., that is higher than each of the reliability scores for the other external decoding systems 146. A reliability score may be an overall accuracy score for a particular external decoding system or may be a score that represents additional reliability data or other reliability data from the tracking database 112. The information aggregation system 102 determines a challenge response received from the selected external system. The information aggregation system 102 uses the determined challenge response for the challenge response data 144.

The information aggregation system 102 may analyze one or more parameters of a Turing test challenge response to generate reliability data for the respective Turing test challenge response. The reliability data may be specific to the Turing test challenge response. The reliability data may be specific to an external decoding system from which the information aggregation system 102 received the response. The reliability data may include a reliability score for a corresponding external decoding system. A reliability score may be a representation of the reliability data for the corresponding external decoding system. The information aggregation system 102, e.g., the CAPTCHA decoder 118 or the response handler 122, may analyze a past accuracy percentage of the external decoding system, e.g., an accuracy score for the external decoding system; a past accuracy percentage of the external decoding system for the site or server from which the Turing test challenge was received; a past accuracy percentage of the external decoding system for the account for which account data is being retrieved; a past accuracy percentage of the external decoding system for the aggregation account for which account data is being retrieved; a past accuracy percentage of the external decoding system for a particular locale or country; a time taken by the external decoding system to generate a Turing test challenge response; reliability data of other external decoding systems; Turing test challenge responses received from other external decoding systems and the external decoding system for a particular Turing test challenge; or a combination of two or more of these, when determining reliability data for the external decoding system.

In some implementations, when the information aggregation system 102 receives different challenge responses from multiple different external decoding systems 146, the information aggregation system 102 may select a particular Turing test challenge response received from an external decoding system with a highest reliability score. The information aggregation system 102 may determine, for each of the external decoding systems 146 from which the information aggregation system 102 received a Turing test challenge response, the reliability score for the external decoding system. The information aggregation system 102 may select the external decoding system with a highest reliability score that is greater than the other determined reliability scores. The information aggregation system 102 may send a Turing test challenge response, received from the external decoding system with the highest reliability score, to the server 124. For instance, the crawler 114 may receive the Turing test challenge response for the external decoding system with the highest reliability score form the CAPTCHA decoder 118 and provide the Turing test challenge response to the server 124, e.g., as part of the message 140.

In some implementations, the information aggregation system 102 may include a retry mechanism. For instance, when the information aggregation system 102 determines that a first Turing test challenge response sent to the server 124 was not accurate, the information aggregation system 102 may select a Turing test challenge response that corresponds to a second highest reliability score and provide the selected Turing test challenge response to the server. The information aggregation system 102 may receive, from the server 124, a message that indicates that the first Turing test challenge response was not accurate. The message may include a new Turing test challenge. The message may include instructions for presentation of a web page, e.g., with the new Turing test challenge.

In some implementations, when the information aggregation system 102 receives the same challenge response from multiple different external decoding systems 146, the information aggregation system 102 may determine a combined reliability score for the challenge response. For instance, the information aggregation system 102 uses the reliability scores for each of the multiple different external decoding systems 146 that generated the same challenge response to determine the combined reliability score.

The information aggregation system 102 compares the combined reliability score with other combined reliability scores or other external system reliability scores for the other challenge responses received from other external systems, e.g., when each of the challenge responses are for the same Turing test challenge. The information aggregation system 102 selects a challenge response with a highest reliability score, e.g., either a combined reliability score or a reliability score for a particular external system. The information aggregation system 102 uses the selected challenge response to generate a message 140 for the server 124.

The information aggregation system 102 may weight reliability scores when determining a combined reliability score. For instance, each reliability score may be a value between zero and one, inclusive. The information aggregation system 102 may weight each of the reliability scores so that a combined reliability score is also between zero and one, inclusive. The information aggregation system 102 may determine the weights using a number of scores that will be combined or another value.

The CAPTCHA decoder 118 may use a unique identifier to maintain session information with the external decoding systems 146. The information aggregation system 102 may generate, for each Turing test challenge, a corresponding unique identifier. The CAPTCHA decoder 118 includes the unique identifier in a message sent to one of the external decoding systems 146, in the CAPTCHA database 108, or in other data used by the external decoding systems 146 to analyze the Turing test challenge and generate a Turing test challenge response.

The CAPTCHA decoder 118 may use the unique identifier to poll the external decoding systems 146 for a Turing test challenge response. In some implementations, when the CAPTCHA decoder 118 does not receive a response from one of the external decoding systems 146 within a predetermined period of time, the CAPTCHA decoder 118 stops polling the one of the external decoding systems 146 and provides the corresponding Turing test challenge to another external decoding system. The other external decoding system may be analyzing the Turing test challenge in parallel with the one of the external decoding systems 146 for which the predetermined period of time expired, e.g., when the CAPTCHA decoder 118 did not receive a response. The CAPTCHA decoder 118 may select the other external decoding system in response to determining that the predetermined period of time expired for the one of the external decoding systems 146.

In some implementations, the CAPTCHA decoder 118 may determine whether no Turing test challenge response will be received and the CAPTCHA decoder 118 should fail all requests for a response to a corresponding Turing test challenge. For instance, the CAPTCHA decoder 118 may determine that the predetermined period of time has lapsed for each of the external decoding systems 146 to which the CAPTCHA decoder 118 provided the Turing test challenge. In response, the CAPTCHA decoder 118 may provide a message to the information aggregation system 102 indicating that no response has been received. The information aggregation system 102 may use the message to determine that the crawler 114 should allow a session with the server 124 to expire. The crawler 114 might not request additional account information from the server 124 after allowing the session to expire until the information aggregation system 102 determines that an external decoding system 146 can provide Turing test challenge responses.

In some implementations, when the CAPTCHA decoder 118 determines that no Turing test challenge response will be received within the predetermined period of time and whether to request input from a user for the account that identifies a response to the Turing test challenge. For instance, the CAPTCHA decoder 118 may determine whether settings for the account indicate that the CAPTCHA decoder 118 can send a prompt to a device operated by the user that requests a Turing test challenge response. When the CAPTCHA decoder 118 determines that the settings indicate that the CAPTCHA decoder 118 can send a prompt to a device operated by the user, the CAPTCHA decoder 118 generates instructions for the presentation of the prompt and provides the instructions to the device. The CAPTCHA decoder 118 may receive data indicating user input in response to providing the instructions to the device. The CAPTCHA decoder 118 may use the data to determine a Turing test challenge response.

In some implementations, the information aggregation system 102 encrypts some or all of the message 140 sent to the server 124. For instance, the information aggregation system 102 may encrypt the user credential data 142, the challenge response data 144, or both. The information aggregation system 102 may encrypt the body of the message 140.

The information aggregation system 102 is an example of a system implemented as computer programs on one or more computers in one or more locations, in which the systems, components, and techniques described below are implemented. The user devices may include personal computers, mobile communication devices, and other devices that can send and receive data over a network. The network (not shown), such as a local area network (LAN), wide area network (WAN), the Internet, or a combination thereof, connects the user devices, the information aggregation system 102, the server 124, and the external decoding systems 146. The information aggregation system 102 may use a single server computer or multiple server computers operating in conjunction with one another, including, for example, a set of remote computers deployed as a cloud computing service.

Figure 2:
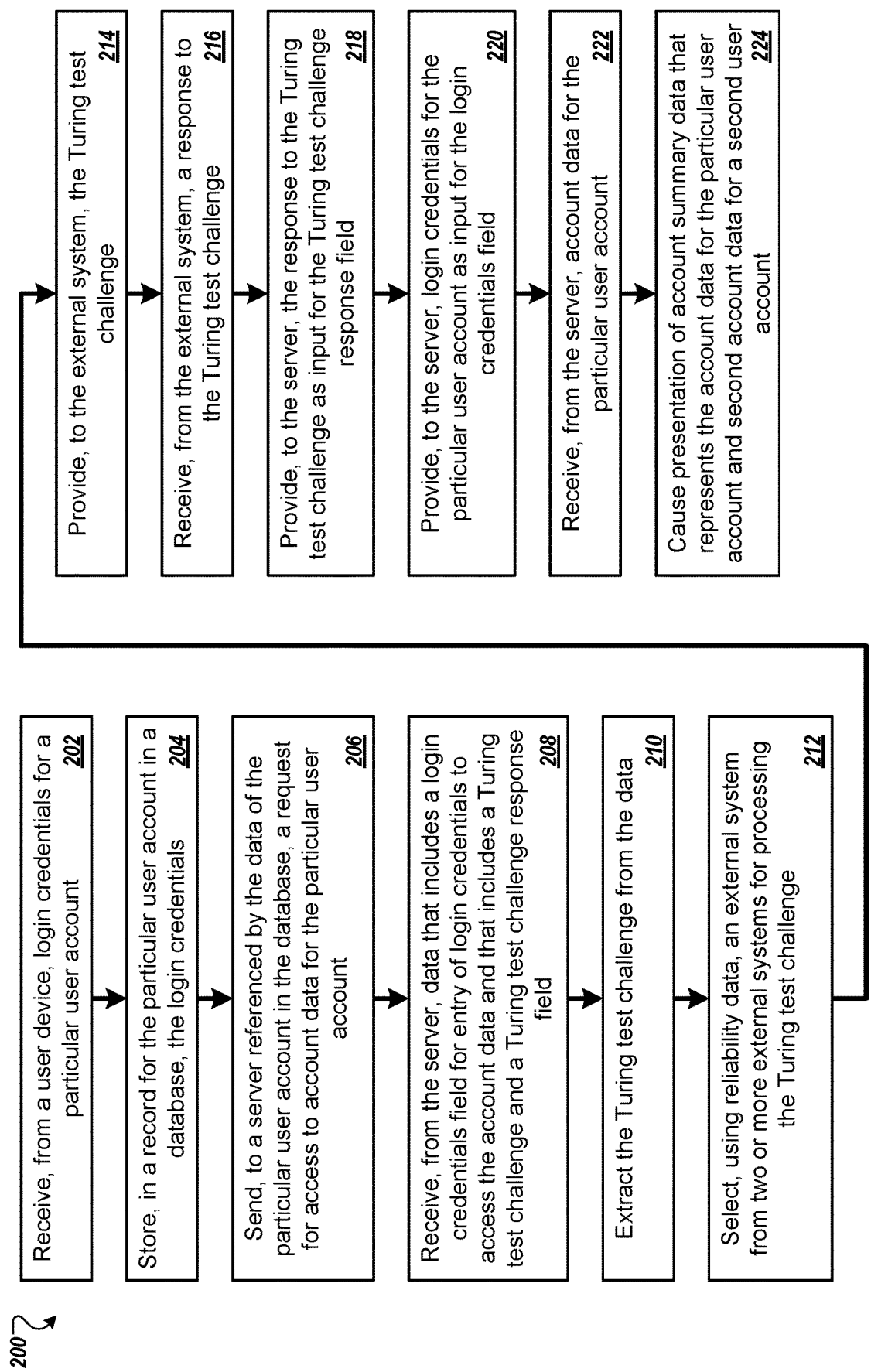
FIG. 2 is a flow diagram of an example process for receiving data for an aggregation account.

FIG. 2 is a flow diagram of an example process 200 for receiving data for an aggregation account. For example, the process 200 can be used by the information aggregation system 102 from the environment 100 of FIG. 1.

An information aggregation system receives (202), from a user device, login credentials for a particular user account. The login credentials may include a user name, a password, or both. The information aggregation system, e.g., a credential input manager included in the information aggregation system, may receive the login credentials from an application executing on a device for a user associated with the particular user account. The application may be a web browser, an application developed for access to aggregation account data, e.g., a client application specific to the information aggregation system, or application configured to communicate with the information aggregation system.

In some implementations, the information aggregation system receives encrypted data. For instance, a connection between the information aggregation system and the user device may use encrypted communications.

The information aggregation system stores (204), in a record for the particular user account in a database, the login credentials. The information aggregation system, e.g., the credential input manager included in the information aggregation system, may store the login credentials, e.g., in an encrypted form, in the database. The encryption used to store the login credentials may be the same or different from the encryption for communications between the user device.

The information aggregation system may create a record in the database that includes only data for the particular user account, e.g., and no other user accounts. For example, the information aggregation system may create a separate record in the database for each user account. A first record may identify login credentials for a university user account and a second record may identify login credentials for a community college user account.

The information aggregation system may include data in the database that indicates that each of the records is for a particular aggregation account, e.g., in each of the separate records or in another record that identifies all of the particular accounts for the aggregation account. The record may be for an aggregation account and include data for multiple user accounts. For instance, a single record for the aggregation account may identify first login credentials for a university user account and second login credentials for a community college user account.

The information aggregation system sends (206), to a server referenced by the data of the particular user account in the database, a request for access to account data for the particular user account. The server reference may indicate a particular URI from which to request the account data. In some implementations, the reference data of the particular user account may be the name of an entity which manages the particular user account, e.g., a service name. The entity may be a school that includes a course list and grades for the particular user account. The particular user account may be any type of account. In some implementations, a crawler may send the request to the server.

The information aggregation system receives (208), from the server, data that includes a login credentials field for entry of login credentials to access the account data and that includes a Turing test challenge and a Turing test challenge response field. The login credentials may include a user name and a password. The login credentials field may include a first field for entry of the user name and a second field for entry of the password. In some implementations, the crawler may receive the data from the server.

The data may include data for a web page that includes the login credentials field, the Turing test challenge, and the Turing test challenge response field. In some implementations, the data may include data for multiple different web pages, each of which include some of the received data.

The information aggregation system extracts (210) the Turing test challenge from the data. The information aggregation system, e.g., a CAPTCHA decoder included in the information aggregation system, may use location information, e.g., a field identifier, to identify and extract data for the Turing test challenge from the data. For instance, the information aggregation system may use a template, e.g., specific to the server, that indicates where in the data the Turing test challenge data is included. The information aggregation system uses the template to extract the Turing test challenge data from the data. The information aggregation system may use any location information to extract the Turing test challenge data from the data.

A template may indicate a structure, specific to the server, of the data that includes the Turing test challenge. For example, a template may identify a position of the Turing test challenge, a position of the login credentials field, or both, in a login page that provides access to account data. The CAPTCHA decoder or a crawler may parse the data using the template to identify the Turing test challenge, the login credentials field, or both, in the login page and extract Turing test challenge data, login credentials field data, or both, from the login page. Similarly, the information aggregation system may identify and extract data for the Turing test challenge response field using the template. The information aggregation system may store the template in a template database that includes a template for servers, e.g., all of the servers or a subset of the servers, from which the information aggregation system requests account data.

The information aggregation system selects (212), using reliability data, an external system from two or more external systems for processing the Turing test challenge. The information aggregation system, e.g., the CAPTCHA decoder included in the information aggregation system, may select the external data system in various ways. For example, the information aggregation system may select the external system from the two or more external systems using reliability data that identifies a time of day, a day of week, a week of year, a month, whether the current day is a holiday, reliability data, or a combination of two or more of these. In some implementations, the information aggregation system may use reliability data that indicates that a particular external system should be used at particular times of the day, days of the week, or holidays.

In some implementations, the information aggregation system may select the external system using information for an entity that manages the particular account, information for the user to whom the particular account belongs, a physical location for the entity, e.g., the physical location at which a school is located, a physical location for a user device on which aggregated information will likely be presented, or a combination of two or more of these. For example, the information aggregation system may use a particular external decoding system for a particular entity, e.g., when the particular decoding system has at least a threshold accuracy score for Turing test challenges received for the particular entity as indicated by reliability data.

The information aggregation system provides (214), to the external system, the Turing test challenge. For instance, the information aggregation system, e.g., the CAPTCHA decoder included in the information aggregation system, may send the particular data, e.g., a CAPTCHA image, to the external system, provide a message to the external system that indicates that the Turing test challenge is available for analysis by the external system, or store the Turing test challenge in memory to allow the external system access to the Turing test challenge. When the information aggregation system stores the Turing test challenge in memory, the information aggregation system may receive a request from the external system for Turing test challenge data. In response, the information aggregation system provides the Turing test challenge to the external system or otherwise allows the external system access to the Turing test challenge and indicates that the Turing test challenge is available.

The information aggregation system receives (216), from the external system, a response to the Turing test challenge. For example, the information aggregation system, e.g., the CAPTCHA decoder included in the information aggregation system, may receive a message from the external system that includes data which identifies the response. The data may be encrypted or unencrypted.

The information aggregation system provides (218), to the server, the response to the Turing test challenge as input for the Turing test challenge response field. The information aggregation system, e.g., the crawler included in the information aggregation system, may use the identifier for the Turing test challenge response field to generate a message with the response to the Turing test challenge. The information aggregation system provides the message to the server.

The message may be formatted according to HTTP POST or any other messaging format. The message may include the response to the Turing test challenge in a body of the message. The information aggregation system may encrypt the response or include a plain text version of the response in the message.

The information aggregation system provides (220), to the server, login credentials for the particular user account as input for the login credentials field. The information aggregation system, e.g., a credential manager included in the information aggregation system, may retrieve the login credentials from an account database, e.g., using an identifier for the particular user account. The information aggregation system, e.g., the crawler, may generate a message that includes the login credentials and an identifier for the login credentials field. The information aggregation system may encrypt the message that includes the login credentials.

The information aggregation system may use the data received from the server that includes the login credentials field to determine the identifier. The information aggregation system may parse the data to determine the identifier, e.g., using a template for an entity that manages the particular account, tags included in the data, or any other method.

In some implementations, the information aggregation system may provide the response to the Turing test challenge and the login credentials to the server at the same time. For instance, the information aggregation system may send a single message or group of messages to the server that includes the response and the login credentials.

The information aggregation system receives (222), from the server, account data for the particular user account. For example, the information aggregation system, e.g., the crawler included in the information aggregation system, receives one or more messages from the server that include the account data. The account data may be specific to the particular user account, such as grades for a user's school account, or might not be specific to the particular user account, such as a subscription news article or social media content.

The information aggregation system causes (224) presentation of account summary data that represents the account data for the particular user account and second account data for a second user account. For instance, the information aggregation system may generate data, e.g., HTML instructions, for presentation of the account summary data. The data may be for presentation of the account summary data in a web browser, in an application, e.g., for the information aggregation system, or in an email message.

The information aggregation system may perform steps 202 through 222, or steps 206 through 222, multiple times for different accounts associated with a particular user. The information aggregation system may determine an aggregation account and all of the user accounts assigned to the aggregation account, such that each user account is associated with a different school, news source, social media source, or another source. The information aggregation system may perform one or more of the steps from the process 200 for each of the user accounts, e.g., including the second user account.

In some implementations, the information aggregation system may generate the account summary data in response to a request for a summary for an aggregation account. The information aggregation system may provide the account summary data in response. The provision of the account summary data to a user device may cause the user device to present an account summary.

The order of steps in the process 200 described above is illustrative only, and receiving data for the aggregation account can be performed in different orders. For example, the account generation system may provide the login credentials to the server and then extract the Turing test challenge. In some implementations, the account generation system receives data that includes the login credentials field and provides the login credentials then receives data that includes the Turing test challenge response field and extracts the Turing test challenge from the data.

In some implementations, the process 200 can include additional steps, fewer steps, or some of the steps can be divided into multiple steps. For example, the information aggregation system may perform steps 218 and 220 together. In some implementations, the information aggregation system may perform steps 206 through 210 and 214 through 222 without performing the other steps described with reference to the process 200.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 3:
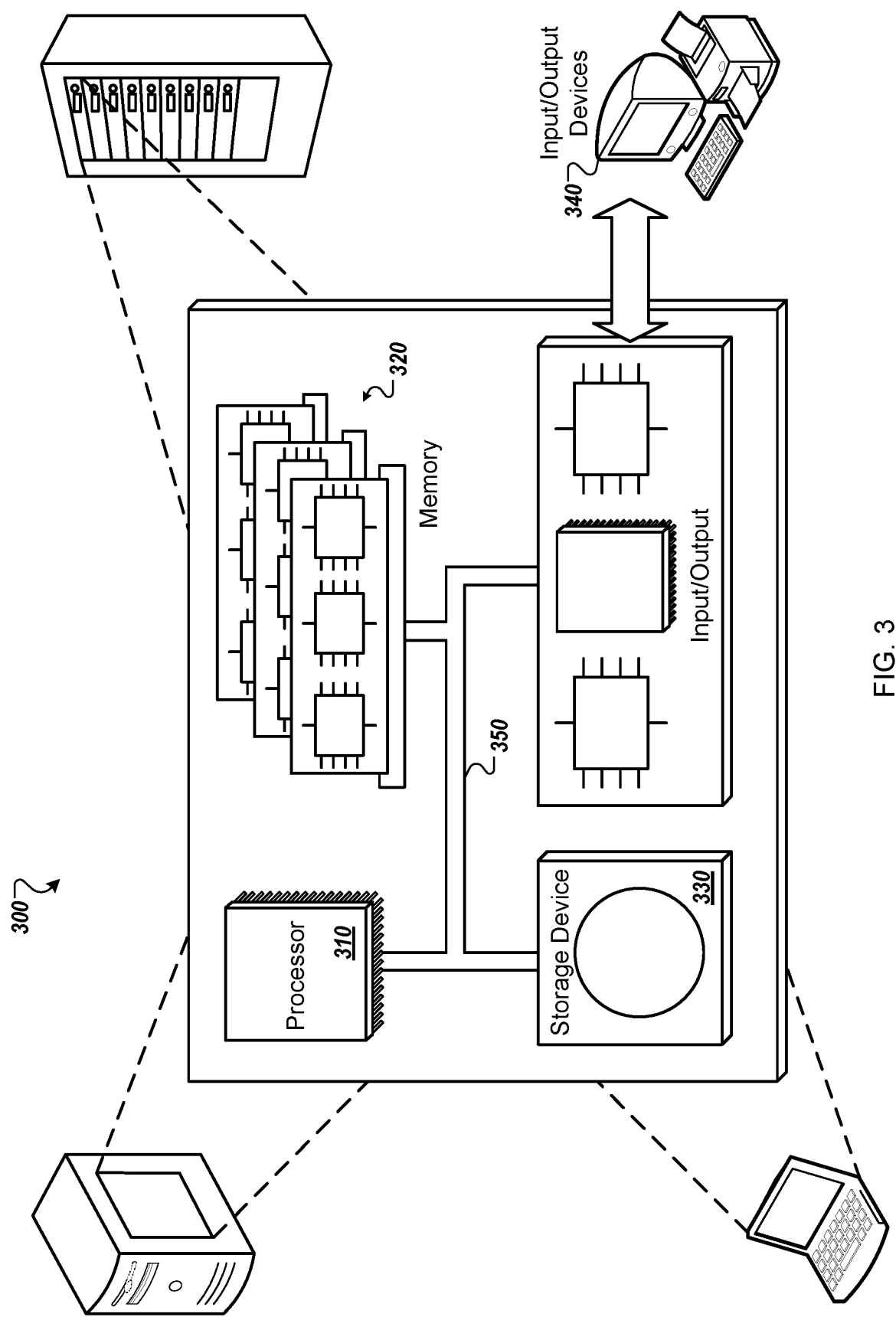
FIG. 3 is a block diagram of a computing system that can be used in connection with computer-implemented methods described in this document.

An example of one such type of computer is shown in FIG. 3, which shows a schematic diagram of a generic computer system 300. The system 300 can be used for the operations described in association with any of the computer-implemented methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
   a database that stores data of each of a plurality of aggregation accounts, each aggregation account identifying one or more user accounts and the data of a particular user account indicating a) a reference to a server from which the system requests account data of the particular user account and b) login credentials for accessing the account data; and
   one or more computers and one or more storage devices on which are stored instructions that are operable, when executed by the one or more computers, to cause the one or more computers to perform operations comprising:
      sending, for the particular user account from the user accounts identified by the plurality of aggregation accounts and to the server referenced by the data of the particular user account in the database, a request for access to the account data for the particular user account;
      receiving, from the server, data that includes i) a Turing test challenge, ii) a Turing test challenge response field and iii) a login credentials field for entry of the login credentials to access the account data, the Turing test challenge having been selected by the server or another system;
      providing, to an external system that is a different system from the server, data for the Turing test challenge;
      receiving, from the external system, a response to the Turing test challenge before a predetermined threshold amount of time has passed;
      in response to receiving the response to the Turing test challenge from the external system before the predetermined threshold amount of time has passed, providing, to the server, the response to the Turing test challenge as input for the Turing test challenge response field;
      providing, to the server, the login credentials for the particular user account as input for the login credentials field; and
      in response to providing the response to the Turing test challenge and providing the login credentials for the particular user account, receiving, from the server, account data for the particular user account.

2. The system of claim 1, the operations comprising:
   receiving, from a user device separate from the external system and prior to receiving the data, the login credentials for the particular user account; and
   storing, in a record for the particular user account in the database, the login credentials.

3. The system of claim 1, comprising:
   a second database that includes reliability data for two or more external systems including the external system, the reliability data indicating a likelihood that respective responses from each external system will be successful for accessing account data, wherein selecting the external system comprises:
      selecting, using the reliability data in the second database, the external system for analysis of the Turing test challenge using the reliability data.

4. The system of claim 1, wherein receiving the response to the Turing test challenge comprises receiving, from the external system, the response to the Turing test challenge before the predetermined threshold amount of time has passed after providing the data for the Turing test challenge to the external system.

5. The system of claim 1, wherein receiving the response to the Turing test challenge comprises receiving, from the external system, the response to the Turing test challenge before the predetermined threshold amount of time has passed after receiving the data that includes the Turing test challenge from the server.

6. The system of claim 1, the operations comprising:
determining whether the response from the external system was received within the predetermined threshold amount of time, wherein providing, to the server, the response to the Turing test challenge as input for the Turing test challenge response field is responsive to determining that the response from the external system was received within the predetermined threshold amount of time.

7. The system of claim 6, comprising:
a second database that includes reliability data for two or more external systems including the external system, the operations comprising:
storing, in the database, reliability data that identifies the external system and indicates that the response to the Turing test challenge received from the external system was received within the predetermined threshold amount of time.

8. The system of claim 1, the operations comprising:
for a second Turing test challenge:
providing, to a second external system, second data for the second Turing test challenge;
determining that a predetermined threshold amount of time has passed without receiving a response to the Turing test challenge from the external system;
providing, to third external system that is a different system from the server and the second external system, the second Turing test challenge;
receiving, from the third external system, a second response to the second Turing test challenge; and
providing, to a second server, the second response to the second Turing test challenge to access account data for a user account.

9. The system of claim 1, the operations comprising:
providing, to one or more second external systems that are each a different system from the server and the external system, the Turing test challenge;
receiving, from each of one or more of the second external systems, a second response to the Turing test challenge;
comparing the response to the Turing test challenge and each of the one or more second responses to determine which responses are the same; and
selecting the response to the Turing test challenge using a result of comparing the response to the Turing test challenge and each of the one or more second responses to determine which responses are the same, wherein providing, to the server, the response to the Turing test challenge as input for the Turing test challenge response field is responsive to selecting the response to the Turing test challenge.

10. The system of claim 9, wherein selecting the response to the Turing test challenge using the result of comparing the response to the Turing test challenge and each of the one or more second responses to determine which responses are the same comprises:
determining that the response to the Turing test challenge was received from a particular external system from a group consisting of the external system and the second external systems that has a higher reliability score than the other external systems in the group.

11. The system of claim 9, wherein selecting the response to the Turing test challenge using the result of comparing the response to the Turing test challenge and each of the one or more second responses to determine which responses are the same comprises:
determining that the response to the Turing test challenge was received from multiple external systems from a group consisting of the external system and the second external systems that together have a higher reliability score than the other external systems in the group.

12. The system of claim 9, wherein selecting the response to the Turing test challenge using the result of comparing the response to the Turing test challenge and each of the one or more second responses to determine which responses are the same comprises:
determining that the response to the Turing test challenge was received from more external systems from a group consisting of the external system and the second external systems than any of the other second responses received from the other external systems in the group.

13. The system of claim 1, the operations comprising:
providing, to one or more second external systems that are each a different system from the server and the external system, the Turing test challenge;
determining that a predetermined threshold amount of time has passed without receiving a response to the Turing test challenge from any of the second external systems; and
in response to receiving the response to the Turing test challenge from the external system before the predetermined threshold amount of time has passed and determining that the predetermined threshold amount of time has passed without receiving a response to the Turing test challenge from any of the second external systems, selecting the response to the Turing test challenge,
wherein providing, to the server, the response to the Turing test challenge as input for the Turing test challenge response field is responsive to selecting the response to the Turing test challenge.

14. The system of claim 1, the operations comprising:
receiving, from the database, the reference associated with the particular user account and the login credentials for the particular user account, wherein sending the request for access to account data for the particular user account is responsive to receiving the reference associated with the particular user account.

15. The system of claim 1, the operations comprising:
receiving, from the database, the reference associated with the particular user account; and
receiving, from the database and after receiving the data that includes the login credentials field for entry of login credentials to access the account data, the login credentials for the particular user account, wherein sending the request for access to account data for the particular user account is responsive to receiving the reference associated with the particular user account.

16. The system of claim 1, wherein providing, to the external system that is a different system from the server, the Turing test challenge comprises sending the Turing test challenge to the external system.

17. The system of claim 1, comprising:
a second database that includes Turing test challenge data, the operations comprising:
storing, in the second database, the Turing test challenge, wherein providing, to the external system that is a different system from the server, the Turing test challenge comprises sending a link that identifies the Turing test challenge to the external system.

18. The system of claim 1, comprising:
a second database that includes Turing test challenge data, the operations comprising:
    storing, in the second database, the Turing test challenge, wherein providing, to the external system that is a different system from the server, the Turing test challenge comprises setting permissions for the Turing test challenge in the second database to allow the external system access to the Turing test challenge in the second database.

19. The system of claim 1, comprising:
a second database that identifies a position for the Turing test challenge in the data, wherein:
    extracting the Turing test challenge from the data comprises:
        parsing, using the position for the Turing test challenge in the data, the data to determine particular data for the Turing test challenge; and
        selecting the particular data from the data.

20. The system of claim 19, wherein:
the second database identifies a second position for the Turing test challenge response field in the data and a third position for the login credentials field in the data;
providing the response to the Turing test challenge as input for the Turing test challenge response field comprises:
    identifying a second identifier for the Turing test challenge response field that is included in the data using the second position for the Turing test challenge response field in the data; and
    providing the response to the Turing test challenge as input for the identified Turing test challenge response field using the second identifier; and
providing login credentials for the particular user account as input for the login credentials field comprises:
    identifying a third identifier for the login credentials field that is included in the data using the third position for the login credentials field in the data; and
    providing the login credentials as input for the identified login credentials field using the third identifier.

21. The system of claim 1, wherein receiving, from the server, data that includes i) the Turing test challenge, ii) the Turing test challenge response field, and iii) the login credentials field for entry of login credentials to access the account data comprises:
    receiving, from the server, first data that includes the login credentials field for entry of login credentials to access the account data; and
    receiving, from the server, second data that includes the Turing test challenge and the Turing test challenge response field.

22. The system of claim 1, wherein the database includes data for an aggregation account from the plurality of aggregation accounts that identifies the particular user account and a second user account, the operations comprising:
    causing, for the aggregation account, presentation of account summary data that represents the account data for the particular user account and second account data for the second user account.

23. A non-transitory computer readable storage medium storing instructions executable by a data processing apparatus and upon such execution cause the data processing apparatus to perform operations comprising:
    sending, for a particular user account from one or more user accounts identified by a plurality of aggregation accounts and to a server referenced by data for the particular user account, a request for access to account data for the particular user account, wherein a database maintains data for each of the plurality of aggregation accounts, each aggregation account identifies one or more user accounts, and the data for a particular user account indicates a) a reference to a server from which the data processing apparatus requests account data of the particular user account and b) login credentials for accessing the account data;
    receiving, from the server, data that includes i) a Turing test challenge, ii) a Turing test challenge response field and iii) a login credentials field for entry of the login credentials to access the account data, the Turing test challenge having been selected by the server or another system;
    providing, to an external system that is a different system from the server, data for the Turing test challenge;
    receiving, from the external system, a response to the Turing test challenge before a predetermined threshold amount of time has passed;
    in response to receiving the response to the Turing test challenge from the external system before the predetermined threshold amount of time has passed, providing, to the server, the response to the Turing test challenge as input for the Turing test challenge response field;
    providing, to the server, the login credentials for the particular user account as input for the login credentials field; and
    in response to providing the response to the Turing test challenge and providing the login credentials for the particular user account, receiving, from the server, account data for the particular user account.

24. A computer-implemented method performed using one or more hardware computers, the method comprising:
    sending, by a system for a particular user account from one or more user accounts identified by a plurality of aggregation accounts and to a server referenced by data for the particular user account, a request for access to account data for the particular user account, wherein a database maintains data for each of the plurality of aggregation accounts, each aggregation account identifies one or more user accounts, and the data for a particular user account indicates a) a reference to a server from which the system requests account data of the particular user account and b) login credentials for accessing the account data;
    receiving, by the system and from the server, data that includes i) a Turing test challenge, ii) a Turing test challenge response field and iii) a login credentials field for entry of the login credentials to access the account data, the Turing test challenge having been selected by the server or another system;
    providing, by the system and to an external system that is a different system from the server, data for the Turing test challenge;
    receiving, by the system and from the external system, a response to the Turing test challenge before a predetermined threshold amount of time has passed;
    in response to receiving the response to the Turing test challenge from the external system before the predetermined threshold amount of time has passed, providing, by the system and to the server, the response to the Turing test challenge as input for the Turing test challenge response field;
    providing, by the system and to the server, the login credentials for the particular user account as input for the login credentials field; and in response to providing the response to the Turing test challenge and providing the login credentials for the particular user account, receiving, by the system and from the server, account data for the particular user account.

25. The method of claim 24, wherein using the one or more hardware computers comprises executing instructions from one or more storage devices.

26. The method of claim 24, comprising:
maintaining, by the database, the data for each of the plurality of aggregation accounts.

\* \* \* \* \*